United States Patent
Roehr et al.

(10) Patent No.: US 6,707,008 B2
(45) Date of Patent: Mar. 16, 2004

(54) METHOD AND APPARATUS FOR CONTROLLING THE DRYING OF PREVIOUSLY BAKED GOODS

(75) Inventors: Eileen Roehr, Ridgefield, CT (US); Mark O. Foster, New Milford, CT (US); Hua Zhang, New Milford, CT (US); Antonio Gutierrez, Kent, CT (US); Mark A. Gaj, Torrington, CT (US); Giinping I. Schmidt, New Milford, CT (US)

(73) Assignee: NESTEC S.A., Vevey (CH)

( * ) Notice: Subject to any disclaimer, the term of this patent is extended or adjusted under 35 U.S.C. 154(b) by 0 days.

(21) Appl. No.: 09/872,099

(22) Filed: Jun. 1, 2001

(65) Prior Publication Data

US 2003/0000935 A1 Jan. 2, 2003

(51) Int. Cl.$^7$ .............................. A21B 1/26; A47J 36/24; A23L 1/00
(52) U.S. Cl. ........................ 219/385; 219/214; 219/400; 219/494; 426/236; 426/496; 426/524; 222/146.5
(58) Field of Search ................................ 219/385, 214, 219/400, 411, 494; 222/146.5; 312/236; 426/236, 524, 496

(56) References Cited

U.S. PATENT DOCUMENTS

| | | | | |
|---|---|---|---|---|
| 3,170,541 A | * | 2/1965 | Werner | 312/236 |
| 3,327,092 A | * | 6/1967 | Wilson | 219/214 |
| 3,632,968 A | * | 1/1972 | Wilson | 219/214 |
| 3,640,207 A | | 2/1972 | Snyder | 99/327 |
| 3,911,248 A | * | 10/1975 | Buday et al. | 219/400 |
| 4,135,369 A | | 1/1979 | Allgeyer et al. | 62/251 |
| 4,664,921 A | | 5/1987 | Seiden | 426/94 |
| 4,674,402 A | * | 6/1987 | Raufeisen | 219/400 |
| 4,752,484 A | | 6/1988 | Pflaumer et al. | 426/94 |

(List continued on next page.)

OTHER PUBLICATIONS

Wisco Industries, Brochure: Prepare Perfect Pizza & Snacks with Wisco Ovens & Warmers (6 pages) (Undated).
"Heated Merchandisers," Henny Penny Corporation (Apr. 1999) (6 pp).

Primary Examiner—Joseph Pelham
(74) Attorney, Agent, or Firm—Winston & Strawn LLP (57) ABSTRACT

A merchandiser and method for displaying and warming previously baked dough products, such as cookies, under controlled drying conditions, including an enclosure having one or more wall members that define an interior space, with at least a portion of one of the wall members being transparent, an aperture for access into the interior space, at least one support surface for supporting one or more previously baked dough products that contain a predetermined average moisture level therein, and at least one mounting structure associated with the enclosure for mounting and positioning each support surface at a user accessible location in the interior space of the enclosure, and a heat source for providing heated air in the enclosure wherein the support surface contacts at least a portion of the previously baked products so that those portions are shielded from direct contact with the heated air such that the drying of moisture in the baked products is controlled to maintain the organoleptic and/or texture properties of the products at essentially the same level as those of freshly baked products for a period of at least about 2 hours.

28 Claims, 4 Drawing Sheets

U.S. PATENT DOCUMENTS

| | | | | |
|---|---|---|---|---|
| 4,822,981 A | * | 4/1989 | Chaudoir | 219/214 |
| 4,850,120 A | | 7/1989 | Stein | 34/88 |
| 4,990,749 A | | 2/1991 | Devine et al. | 219/385 |
| 5,123,178 A | | 6/1992 | Stein | 34/88 |
| 5,132,520 A | | 7/1992 | Blanton et al. | 219/400 |
| 5,285,051 A | * | 2/1994 | DeGrow et al. | 219/386 |
| 5,365,039 A | * | 11/1994 | Chaudoir | 219/401 |
| 5,375,511 A | | 12/1994 | Huie et al. | 99/483 |
| D364,530 S | | 11/1995 | Robards, Jr. et al. | D7/350 |
| 5,505,009 A | | 4/1996 | Stein et al. | 34/543 |
| 5,553,934 A | | 9/1996 | Wells et al. | 312/128 |
| 5,639,149 A | | 6/1997 | Grassmuck | 312/116 |
| 5,771,789 A | * | 6/1998 | Davis | 99/483 |
| 5,948,301 A | | 9/1999 | Liebermann | 219/395 |
| 6,098,529 A | | 8/2000 | Brummett et al. | 99/467 |
| 6,111,224 A | | 8/2000 | Witt | 219/385 |
| 6,124,572 A | | 9/2000 | Spilger et al. | 219/400 |
| 6,127,659 A | | 10/2000 | Friedman et al. | 219/398 |
| 6,159,514 A | * | 12/2000 | Brummett et al. | 426/392 |
| 6,198,076 B1 | | 3/2001 | Moen et al. | 219/400 |
| 6,259,065 B1 | * | 7/2001 | Hohler et al. | 219/400 |
| 6,265,695 B1 | * | 7/2001 | Liebermann | 219/214 |
| 6,315,039 B1 | * | 11/2001 | Westbrooks, Jr. et al. | 219/387 |

\* cited by examiner

METHOD AND APPARATUS FOR CONTROLLING THE DRYING OF PREVIOUSLY BAKED GOODS

TECHNICAL FIELD

The present invention is directed to a method and apparatus for warming and controlling the drying of previously baked dough products to retain its originally baked characteristics over time. In particular, the apparatus and method control the moisture in the previously baked good, such as a cookie or other baked dough product, to provide a desired drying profile over an increased period of time in order to maintain its originally baked dual texture.

BACKGROUND OF THE INVENTION

In order for previously baked products to maintain a high quality during display for sale, they have to be handled under precise conditions during their storage. They are usually heated throughout the vast majority of their display period to provide a warmed baked product ready for sale and consumption. This has significant consequences for textural characteristics, including bite and mouthfeel.

Previously baked dough products are displayed for sale in many different ways. Many such products are sold in sealed boxes or bags to retain the moisture content. Such sealed containers, however, result in the equilibration of moisture in the baked products over a period of time. Any moisture gradient that exists after baking is eliminated over time as the moisture migrates from the portion(s) having more moisture to the portions having less. This tends to result in a baked product that is soggy or, at best, uniformly moist and soft, such that it will not have a fresh baked character, i.e., crisp and chewy, after storage for a period of time.

Other previously baked products are sold in a large glass display case that is often open to the air on at least one side. Such displays typically result in significant or even complete loss of moisture from the previously baked product over time, as the moisture evaporates into the air. The products become hard due to the drying out of the moisture. This is particularly true of heated displays, and such heating can occur simply from long-term exposure to incandescent illumination used in many such displays to make the baked products more attractive to the consumer.

Existing devices to simultaneously heat and display baked products using conduction and convection are available for pizzas and operate at temperatures high enough to keep cheese in a soft and at least partially molten form, i.e., from 145° F. to 160° F. Also, many of these conventional heated devices for warming baked products typically dispose these products on a wire rack or a round pizza pan that exactly fits the product. At least some such prior art devices have a thermometer placed near the heat source and use a heat source at the top of the enclosure to directly heat at least the top pizza. Several such devices of this type are sold by Wisco Industries, Inc.

U.S. Pat. No. 5,132,520 discloses an apparatus used to toast bread and buns, which then hot-holds the toasted bread and buns.

U.S. Pat. Nos. 6,098,529 and 6,159,514 disclose a heated merchandiser for displaying prepared donuts using both hot and cold light sources. The reference discloses that some heating occurs to temperatures of 85° F. to 110° F.

In sum, there is no existing apparatus or method to facilitate the display of a previously baked product that can maintain its fresh baked profile over a period of time to entice the consumer to purchase and consume the product. Despite the difficulties of retaining the fresh baked profile of previously baked products over time, retailers and their customers desire such products. For added convenience, economic reality, and for culinary delight, it is therefore desirable to have available previously baked products that retain their fresh baked character over time without deterioration of desired organoleptic properties.

Thus, there remains a need for equipment and methods to provide such a stable baked product that retains the character of a fresh baked product. The present invention teaches such equipment and methods without the aforementioned disadvantages of existing equipment and methods.

SUMMARY OF THE INVENTION

The invention relates to a merchandiser for displaying and warming previously baked dough products under controlled drying conditions. This merchandiser includes an enclosure having one or more wall members that define an interior space, with at least a portion of one of the wall members being transparent, an aperture for access into the interior space, at least one support surface for supporting one or more previously baked dough products that contain a predetermined average moisture level therein, at least one mounting structure associated with the enclosure for mounting and positioning each support surface at a user accessible location in the interior space of the enclosure, and a heat source for providing heated air in the enclosure. The support surface contacts at least a portion of the previously baked products so that those portions are shielded from direct contact with the heated air such that the drying of moisture in the baked products is controlled to maintain the organoleptic and/or texture properties of the products at essentially the same level as those of freshly baked products for a period of at least about 2 hours.

Advantageously, the baked products have a relatively flat base portion and a top portion, and wherein each support surface includes a tray member having a flat upper surface that supports and contacts the base portions of the baked products so that those base portions are shielded from heated air in the enclosure and dry at a rate that is different from that of the top portions of the baked products.

For convenience in placing the tray members into the enclosure, the tray members include a lip extension on at least one side thereof. This lip also assists in preventing baked products from sliding off the tray member. Thus, the tray member may be removably mounted upon the mounting structure to facilitate product placement thereon and cleaning thereof.

The enclosure preferably includes front and rear walls, and the heat source comprises electrical illumination which generates light to illuminate the baked products as well as heat to warm the air in the enclosure. The electrical illumination may be light bulbs that are arranged symmetrically within the enclosure to direct light and heated air substantially uniformly toward the tray member and the baked products thereon. These light bulbs generally have a total wattage of about 75 W to 130 W and are placed about 14 cm from the tray member.

If desired, the heat source may be a heating element for heating the air in the enclosure. Although direct conduction heating of the products can be at least in part accomplished by disposing a heat source in the tray, it is preferred that the heating element be located sufficiently away from the baked products and tray such that direct heating of the products on the tray by the element is substantially avoided. Such direct heating can overcook and dry out the baked products. Also, the heat source should operate to maintain the interior space of the enclosure at a set temperature of about 95° F. to about 150° F. so that the baked product retains its organoleptic and/or texture properties for a period of at least about 6 hours. In preferred embodiments, the temperature is within about 10° F., or within about 5° F. of the desired set temperature throughout the entire enclosure.

For better heat control in the enclosure, the merchandiser further includes a temperature control system capable of maintaining the heated air to within about 5° F. of a desired temperature at a given point over time. Preferably, the temperature is maintained at a constant to within about 2° F. of the desired temperature at a given point over time. This can be achieved by use of a proportional controller that provides an error signal that is proportional to the differential of actual temperature from the set point. Generally, the proportional temperature control system comprises a solid-state rectifier controlled by a proportional circuit and a thermistor sensor to provide the exact amount of electric power needed to maintain a constant temperature. Also, at least one thermometer can be placed sufficiently far from each aperture of the enclosure and each heat source to accurately monitor the temperature in the enclosure.

The invention also relates to a cookie merchandiser for displaying and warming previously baked cookies under controlled drying conditions. This device includes an enclosure having an interior space, at least one aperture such as a door for access into the interior space, at least one support surface for supporting one or more previously baked cookies that contain a predetermined average moisture level of about 5 to 9 percent by weight therein, a structure associated with the enclosure for mounting and positioning each support surface at a user accessible location in the interior space of the enclosure, and a heat source for providing heated air in the enclosure wherein the support surface contacts at least a portion of the cookies so that those portions are shielded from direct contact with the heated air such that the drying of moisture in the cookies is controlled to maintain the organoleptic and/or texture properties of the warmed cookies at essentially the same level as those of fresh baked cookies for a period of at least about 2 hours.

Preferably, the enclosure includes a roof structure for receiving and concealing the heat source and the vertical walls include a front wall, pair of side walls, and a rear wall disposed between the front and side walls, wherein more than one wall is made at least partially transparent to facilitate viewing of the baked products therein from different angles. Also, the roof structure is adapted on at least one outer surface to receive advertising concerning the cookies therein, which advertising is visible to the user.

Another aspect of the invention relates to a method for displaying and warming previously baked dough products under controlled drying conditions. This method includes the steps of providing previously baked dough products that contain a predetermined average moisture level in an enclosed space upon a support surface such that the support surface contacts at least a portion of the baked products, and providing heated air in the enclosed space so that those supported portions of the baked products are shielded from direct contact with the heated air to control the drying of moisture from the baked products and to maintain their organoleptic and/or texture properties at essentially the same level as those of freshly baked products for a period of at least about 2 hours. The heated air can be circulated in the enclosed space to assist in the controlled drying of the baked products. Advantageously, the interior space is maintained at a temperature of about 95° F. to 150° F. so that the baked products retain their organoleptic and/or texture properties for a period of at least about 6 hours.

Alternatively, the method includes the steps of providing previously baked cookies that contain a predetermined average moisture level in an enclosed space upon a support surface such that the support surface contacts at least a portion of the cookies, and providing heated air in the enclosed space so that those supported portions of the cookies are shielded from direct contact with the heated air in order to control the drying of moisture from the cookies and to maintain their organoleptic properties at essentially the same level as those of freshly baked cookies for a period of at least about 2 hours.

Another aspect of the invention relates to a method for providing a moisture gradient in a plurality of previously baked products. This method comprises disposing the previously baked products in an enclosure on a support member therein that contacts at least a portion of the base of each product to inhibit moisture loss from the products, and circulating a heated gas within the enclosure to provide the moisture gradient in the plurality of baked products over a period of at least about 2 hours. Again, the heated gas preferably is heated air.

At least about 34 percent of the base of each product contacts the support member and the enclosure is configured and arranged to reduce the loss of moisture therefrom in order to achieve this moisture gradient. The gas may be heated to a predetermined temperature to warm the previously baked product and preferably at least about 50 percent of the base of each product contacts the support member. In preferred embodiments, at least about 75 percent or at least about 100 percent of the base of each product contacts a support member.

In this invention, the baked products to be warmed have a central portion and an outer portion arranged about the central portion so as to retain a moisture gradient that comprises at least about 8 percent water content in the central portion of the baked product and below about 7 percent water content in the outer portion of the baked product for several hours during warming. The central portion typically represents the innermost 33 to 66% of the area or volume of the product while the outer portion represents the outermost 17 to 33% of the area or volume of the product. Preferably, the moisture gradient comprises at least about 7.5 percent water content in the central portion and below about 4 percent water content in the outer portion after about 6 hours in the enclosure. When the baked product is a substantially round cookie of about 2 to 5 inches in diameter, the central portion is a width of about ¾ inch to 1¼ inch and the outer portion is a band having a diameter of about ¼ to ¾ inch as measured from the periphery of the cookie.

The invention also relates to a baked cookie having a dual texture, i.e., crisp and chewy, and an average moisture level of about 6.5 to 10 weight percent water moisture after baking, which cookie has a dual texture and retains the average moisture level for at least about 2 to 8 hours after baking. The dual texture of these cookies comprises a central zone having a diameter of at least about ¾ inch at the center of the cookie and an outer zone of a band having a width of at least about ¼ inch adjacent the edge of the cookie and disposed about the central zone, and wherein the outer zone has a lower moisture content than the central zone.

The invention relates to a modular merchandiser system for displaying and warming previously baked dough products under controlled drying conditions. This device comprises a merchandiser section and a warming section.

The merchandiser is generally an enclosure having one or more wall members that define an interior space, with at least a portion of one of the wall members being transparent, at least one aperture for access into the interior space, at least one support surface for supporting one or more previously baked dough products that contain a predetermined average moisture level therein, and at least one mounting structure associated with the enclosure for mounting and positioning each support surface at a user accessible location in the interior space of the enclosure, and a heat source for providing heated air in the enclosure. Thus, the support surface contacts at least a portion of the previously baked products so that those portions are shielded from direct contact with the heated air such that the drying of moisture in the baked products is controlled to maintain the organoleptic properties of the products at essentially the same level as those of freshly baked products for a period of at least about 2 hours.

The warming section comprises a warming compartment disposed adjacent to the merchandiser. Preferably, the merchandiser is disposed over the warming compartment. The warming compartment advantageously comprises a heat source that operates at a temperature of about 300° F. to 475° F. to thaw and begin to warm previously baked frozen cookies in less than about 10 minutes. Preferably, the warming compartment comprises a heat source that operates at a temperature of about 350° F. to 425° F. to thaw frozen cookies previously baked in less than about 5 minutes. The warming compartment is sized and configured to receive at least one support surface that is also used in the merchandiser for warming and displaying the warmed, baked products, and includes at least one mounting member for engaging the at least one support surface.

The warming compartment may also include at least one controller for automatic cycling to alert an operator that the thawing cycle is completed. Furthermore, this controller may open the warming compartment when the heating cycle is complete, such as by ejecting the support surface of thawed, baked goods after the compartment opens. For security and safety, the controller can initiate an audible or visible alarm when the heating cycle is completed.

Another aspect of the invention relates to a method for displaying and warming previously baked, frozen, dough products under controlled drying conditions. This method includes the steps of thawing the frozen dough products on a support surface which contacts at least a portion of the base of each frozen dough product, the thawing being conducted at a temperature of about 300° F. to 475° F. for less than about 10 minutes to warm the frozen dough products while retaining a desired moisture profile therein, and displaying the warmed dough products in an enclosed space upon the support surface while providing heated air in the enclosed space so that those supported portions of the baked products are shielded from direct contact with the heated air to control the drying of moisture from the baked products and to maintain their organoleptic properties at essentially the same level as those of freshly baked products for a period of at least about 2 hours.

Advantageously, the interior space is maintained at a temperature of about 95° F. to 150° F. so that the baked products retain their organoleptic and/or texture properties for a period of at least about 6 hours. If desired, the heated air can be circulated in the enclosed space to assist in the controlled drying of the baked products and to reduce the warming-up time of any frozen baked products. If so, the heated air is circulated within the enclosed space to provide the moisture gradient in the plurality of baked products over a period of up to about 6 hours.

At least about 34 percent, preferably at least about 50% of the base of each product contacts the support member and the enclosure is configured and arranged to reduce the loss of moisture therefrom in order to achieve this moisture gradient. The gas may be heated to a predetermined temperature to warm the previously baked product and preferably at least about 50 percent of the base of each product contacts the support member. In preferred embodiments, at least about 75 percent or, ideally, at least about 100 percent of the base of each product contacts the support member.

In this invention, the baked products to be warmed have a central portion and an outer portion arranged about the central portion so as to maintain a moisture gradient that comprises at least about 8 percent water content in the central portion of the baked product and below about 7 percent water content in the outer portion of the baked product. The central portion typically represents the innermost 33 to 66% of the area or volume of the product while the outer portion represents the outermost 17 to 33% of the area or volume of the product. Preferably, the moisture gradient comprises at least about 7.5 percent water content in the central portion and below about 4 percent water content in the outer portion after about 6 hours in the enclosure. When the baked product is a substantially round cookie of about 3 to 5 inches in diameter, the central portion is a width of about ¾ inch to 1¼ inch and the outer portion is a band having a diameter of about ¼ to ¾ inch.

BRIEF DESCRIPTION OF THE DRAWINGS

Further features and advantages of the invention can be ascertained from the following detailed description that is provided in connection with the drawing(s) described below.

DETAILED DESCRIPTION OF THE PREFERRED EMBODIMENTS

The present invention advantageously provides a device and method for displaying and warming previously baked dough products, such as cookies, brownies, muffins, and the like, under controlled drying conditions. Preferably, the device is used to display and warm baked sweet dough products. The invention permits and facilitates food service sales, which are baked products prepared at a centralized food preparation center, if desired, and distributed later to the retailers that intend to display and sell the product according to the invention. The device includes an enclosure to display the baked products while they are maintained in a substantially fresh baked state, i.e., by controlling the drying of the products. In particular, this controlled drying is achieved by creating a moisture gradient in the baked product. For cookies, controlled drying avoids moisture equilibration in the baked product and allows the cookie to retain a crisper, drier, outer zone and a chewier, moister central zone, i.e., a dual texture. This also avoids the need to use two or more dough formulations to achieve texture variation in the baked products. The device typically includes a heat source to heat the baked products to provide the controlled drying thereof. In one embodiment, the invention warms and displays the previously baked dough products without the need for an oven.

The enclosure typically has one or more wall members that define an interior space, with at least a portion of one of the wall members being transparent, at least one aperture for access into the interior space, at least one support surface for supporting one or more previously baked dough products that contain a predetermined average moisture level therein, and at least one mounting structure associated with the enclosure for mounting and positioning each support surface at a user accessible location in the interior space of the enclosure. The wall members can be formed of any suitable material. At least one wall is preferably transparent to lure the customer to view the delicious baked treats therein without having to open the enclosure, which minimizes the amount of times the enclosure is accessed. Opening the chamber too often can permit moisture to escape the chamber and accelerate drying. One or more small air gaps, however, can be included in the enclosure.

In a preferred embodiment, at least three or four wall members are transparent or are at least sufficiently transparent to permit a viewer to see the baked products therein. In another preferred embodiment, a small air gap is present in between at least one of the apertures and a wall member to permit aroma from the warmed, baked products to escape into the surrounding atmosphere. The air gap can also be, for example, one or more holes in one or more wall members. This air gap advantageously permits consumers to smell the baked products without having to open the aperture, although additional aroma does escape the enclosure each time the aperture is opened. The air gap should be sized sufficiently to permit a small amount of aroma to escape but small enough to retain substantially all of the moisture within the enclosure.

The aperture to access the baked products is typically a door, either hinged or sliding, to permit rapid and easy access to the products when a purchase is desired. Other types of suitable apertures will be readily apparent to those of ordinary skill in the art. One preferred aperture is to have a door on the same side of the enclosure as a transparent wall member so that a consumer can see the baked product and open the aperture to grab the desired baked product. Another preferred embodiment is to have a second aperture on the opposite wall member or an adjacent wall member for the retailer to add additional baked products. As the merchandiser is emptied of baked products by consumers, product replacement can be made a few at a time, or an entire tray can be removed and a fresh tray of baked products loaded therein. The opposite wall member is a preferred location for the second door, although placement of the merchandiser in a corner location of a room would require placement of the second aperture on an adjacent wall member for simplicity of access.

The at least one support surface typically includes a surface that is at least substantially planar. The surface(s) can be, for example, a tray or sheet on which to display the baked products in the enclosure. The surface(s) is shaped and dimensioned to fit in the enclosure, which will for instance have a square or rectangular shape. The surface(s) each have at least one edge that can also optionally be turned upward or downward to form a lip or notch. An upward lip can be included to inhibit or prevent the baked goods from sliding or falling off the surface. A downward lip or notch can be included on the surface to help position the surface within the enclosure such as by operatively associating the properly positioned surface against a lip or wire mounting assembly within the enclosure. Multiple lips or notches in either or both directions can also be used to similar effect. The support surface can also have notched corners where no lip exists. This embodiment avoids any point where more than two edges join, which facilitates cleaning the support surface between uses in the merchandiser.

In one preferred embodiment, the enclosure includes two surfaces on which to display a variety of baked goods. For example, cookies can be disposed on one surface and brownies on the other. In a preferred embodiment, the surfaces are disposed in a vertically stacked fashion with sufficient spacing therebetween to permit the consumer to both view and access the baked products disposed thereon. The support surface can be a tray used to bake the product in another apparatus, which tray can then be moved into the merchandiser of the present invention without having to individually place the baked products into the merchandiser. Alternatively, the support surface can be a sheet or wire rack upon which the previously baked products can be individually disposed before the sheet or rack is placed in the enclosure. These embodiments can help avoid the need to keep the enclosure open to the ambient atmosphere for a long time, which affects the controlled drying of products remaining in the enclosure such as on a second support surface therein. It is also desired that the support surfaces, or trays, be sloped at an angle to make more of the baked products more clearly visible to the consumer, which sloping also improves the convective heat transfer.

The previously baked dough products preferably have a predetermined average moisture level therein. The initial moisture content can be adjusted to take into account the subsequent loss of moisture that necessarily occurs depending on the residence time in the merchandiser while the warmed product still exhibits the desired organoleptic and/or texture properties. In one embodiment where the product is a cookie, the cookie contains an average of about 6 to 10 weight percent moisture, preferably 5 to 8 weight percent moisture, after the initial baking and during storage thereof. The initial moisture level can be controlled by the water in the recipe and during the baking of the product. These initial moisture levels are preferably accomplished by freezing the cookie as noted herein. Refrigeration or freezing does not typically significantly alter the initial moisture content if the baked products are properly packaged. Preferably, the edge of the previously baked cookie has a moisture content of about 5 to 6.5 weight percent after a one-hour residence time in the merchandiser. The center zone of the previously baked cookie has an initial moisture content of about 7 to 10 weight percent before warming, while in one preferred embodiment the center zone has about 8 to 9 weight percent moisture before warming. The initial moisture content represents the level of moisture present in the products immediately after baking, and the invention preferably uses baked products that are packaged within about 1 hour of being baked, preferably within about ½ hour, to help inhibit moisture loss in the product prior to packaging and subsequent warming for display and sale.

The previously baked products are also preferably chilled promptly after packaging, and preferably are frozen until ready for use. The freezing of previously baked products also facilitates retaining moisture and a moisture profile within the products. Thus, the products in which dual texture is desired are typically frozen in less than about 4 days, preferably less than about 1 day, and more preferably less than about 6–8 hours, after baking. Such rapid freezing inhibits moisture equilibration, which reduces crispness of the edges of the baked products. The freezing should also occur over a sufficient time to permit a reduction in condensation and inhibit or avoid possible frost formation inside the package of previously baked products. Thus, the cooling and freezing should take at least about 30 minutes. The specific recipe of the baked product is not critical, however, using certain types of fats and humectant sugars, as well as varying the size and shape of the baked products, can modify the desired moisture profile in the baked product when warmed for display and sale as is understood by those of ordinary skill in the art, particularly with reference to this description. For example, sugars that bind the moisture and inhibit migration are desired to facilitate the dual texture products, although the recipe is less important for baked products that are frozen soon after baking as noted above. One particularly suitable baked product formulation is the cookie recipe available on the commercially available Tollhouse® chocolate chip morsel packaging, as well as reasonable variations thereof.

The at least one surface in the enclosure is operatively associated with at least one mounting structure, which is itself associated with the enclosure. The mounting structure (s) are disposed for mounting and positioning each support surface at a user accessible location in the interior space of the enclosure. For example, the mounting structure itself can be a wire rack, optionally fixed to the walls of the enclosure, for receiving and supporting a support surface and the baked products typically disposed thereon. In a preferred embodiment, the mounting structure includes at least a lip or edge fixed to at least two opposing walls of the enclosure to guide and receive a support surface so that no wire rack is needed in the central portion of the merchandiser. The use of a mere lip without a wire rack is desired because an inattentive store clerk might be likely to ignore the support surface and dispose the baked products on the open wire rack, which would too rapidly dry out the baked products. The use of a lip as the mounting structure forces the user to dispose the cookies on the support surface and install the surface in the enclosure.

The merchandiser also contains a heat source for providing heated air in the enclosure. The heat source can be any suitable heat source available to those of ordinary skill in the art, such as incandescent lamps, conventional heat lamps, heating coils, and the like, as well as combinations thereof. Incandescent lamps and heating coils are preferred since they can be better adjusted to avoid heating the baked products too much or too fast. The heat source can be placed in a cage at the top of the enclosure, where the cage can help prevent injury to a consumer if the heat source fails catastrophically. Preferably, an incandescent-type heat source at the top of the enclosure includes PTFE-coated bulbs (TEFLON®) to inhibit such catastrophic failures, directional lamp bulbs to direct heat into a preferably more symmetrical heating pattern, or a combination thereof. The position, number, and wattage of the bulbs needs to be designed according to the size of the enclosure, as can be readily determined by those of ordinary skill in the art based on the description herein. Preferably, at least two incandescent bulbs are included in the heat source. In one preferred embodiment, each bulb is about 75 W to 140 W, preferably about 100 W to 130 W, and located about 14 cm from the support surface such as a tray member.

Figure 1:
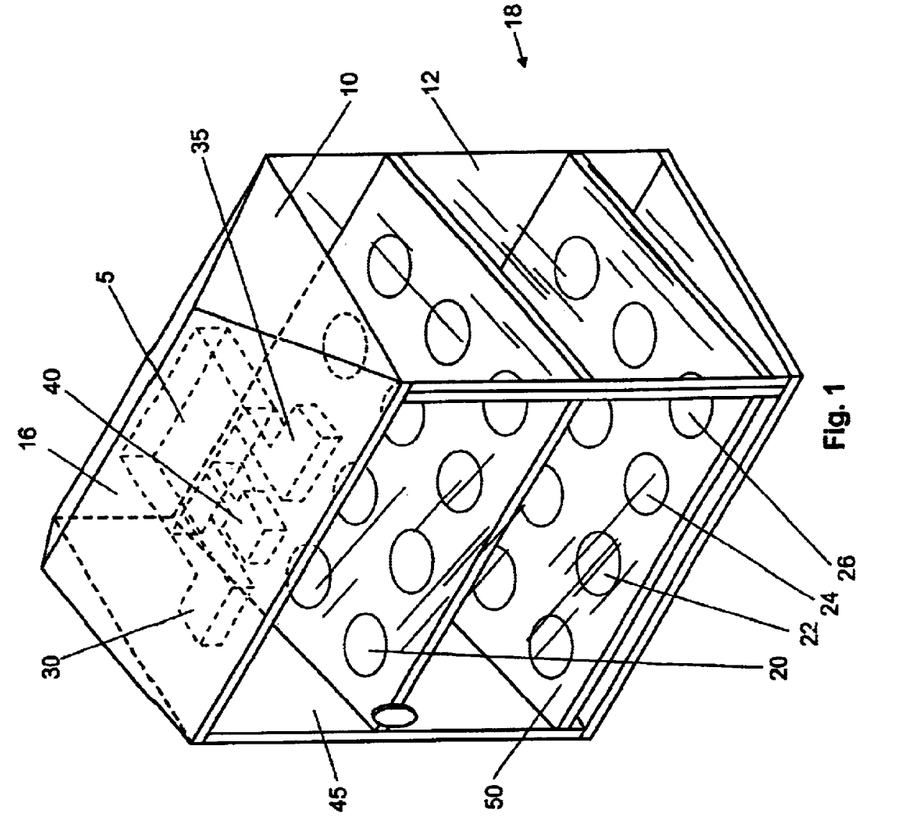
FIG. 1 illustrates a convection-type merchandiser according to the invention.

FIG. 1 shows a merchandiser according to the invention using convection-type heating. In FIG. 1, the heat source 5 is preferably disposed in a housing 10 above the walls 12, 14, 16 of the enclosure 18. The housing 10 is preferably at least substantially sealed to the walls 12, 14, 16 to inhibit moisture migration between the enclosure 18 and the ambient atmosphere. The housing 10 is preferably opaque so that the consumer will focus on the baked products 20, 22, 24, 26, etc., rather than the workings of the merchandiser. Another benefit of having a housing 10 disposed over the enclosure 18 is that the housing 10 can be designed to receive advertising (not shown) regarding the baked products 20, 22, 24, 26 in the associated enclosure 18. One or more fans, pumps, or other methods of moving air within the enclosure is optionally, but preferably, used to help control drying and to facilitate a substantially uniform temperature within the enclosure. Such air-moving device(s) (not shown) are preferably disposed in or adjacent to the housing 10. Preferably, there are at least two outlets 30, 35 for every inlet 40, which helps disperse the warmed air evenly into the enclosure 18 as it exits the outlets 30, 35. In another preferred embodiment, there is one inlet 40 for returning air to be heated and two outlets 30, 35 for warmed air to enter the enclosure 18 to warm the previously baked products 20, 22, 24, 26. In one embodiment, the heat source 5 includes heat-producing lamps disposed in a direct line (not shown) above the support surface 45, 50 and in a symmetrical pattern so as to provide substantially even heating via radiation to the baked products on the support surface. In a preferred embodiment, the heat source 5 includes heat-producing lamps disposed out of a direct line with the support surface 45, 50 so as to avoid application of radiation to heat the baked products 20, 22, 24, 26. In this embodiment, the air-moving device(s) is (are) required to ensure convective heating of the baked products, which will facilitate substantially even heating thereof. It should be understood that convection heating for at least substantially all, or all, of the heating is desired to avoid overdrying the baked products in the apparatus. Without being bound by theory, it is believed that convection forms a thin hardened moisture barrier on the skin of the baked product to a greater extent than other forms of warming. This skin is believed to inhibit moisture migration from the central zone of the baked product.

Figure 2:
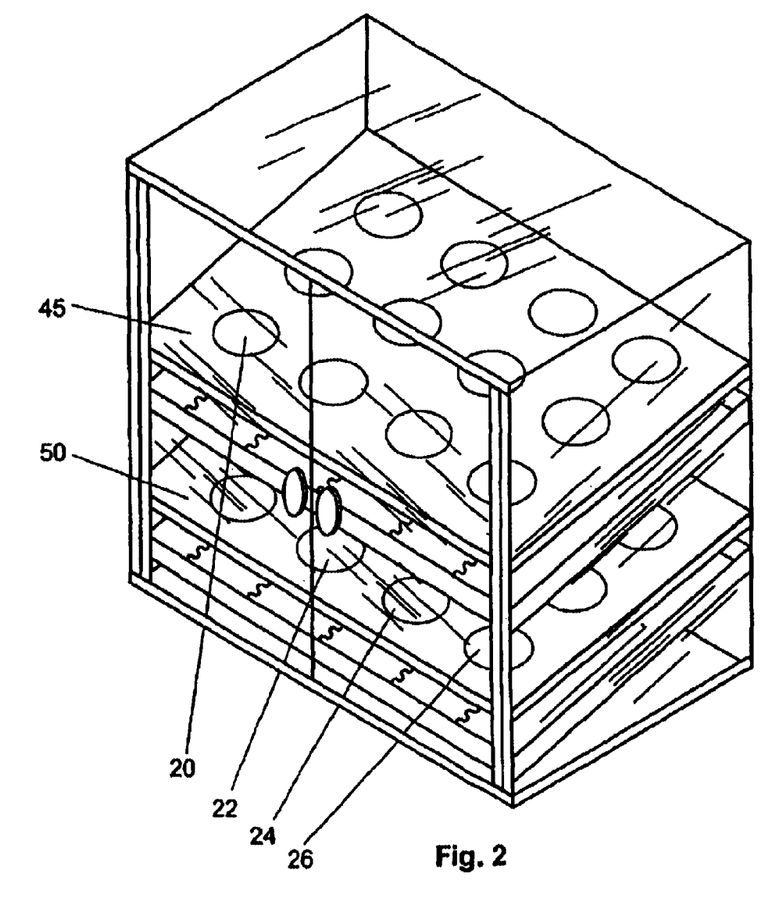
FIG. 2 illustrates a conduction-type merchandiser according to the invention.
Figure 2A:
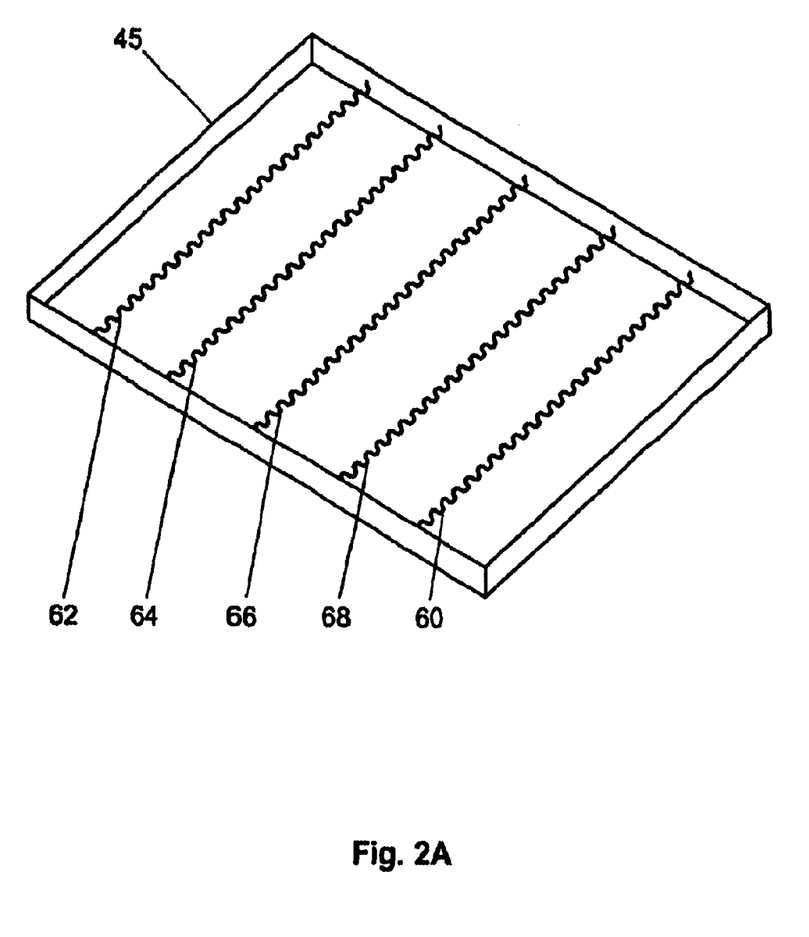
FIG. 2A illustrates a cutaway of a support surface that can be used in the conduction-type merchandiser.

In two additional embodiments, the heat source includes heating coils disposed above or under the baked products. In either embodiment, the coils are preferably uniformly disposed to provide a symmetrical, and therefore even, heat pattern to the baked products. Preferably, as shown in FIG. 2, the coil(s) are disposed under the baked products 20, 22, 24, 26 inside the mounting structure(s) or support surface(s) 45, 50. FIG. 2A, a cutaway of the support surface 45 in FIG. 2, shows the coils 60, 62, 64, 66, 68. In this design, there is preferably an air gap between the top of these heating coil(s) and the surface on which the baked products are disposed. The air gap can be about 0.5 inch to 1 inch between the heating elements 60, 62, 64, 66, 68 and the baked products on the support surface. In another but less preferred embodiment, rings or other flexible heating devices can be embedded within the support surface itself. This permits the shape of the heating device to match the shape of the baked product, e.g., round or rectangular, to heat just the baked product without excess heating. While the trays are designed to support the bottom surfaces of the baked products, stacking may incorrectly position the products on the trays. When the trays are designed with only partial heated areas, some products may not be properly heated and warmed. Thus, convection heating is preferred in these instances.

The convection heating of the baked products in the enclosure of the merchandiser preferably has the following parameters. The Reynolds No. of airflow in the enclosure is preferably below about 2300 to avoid significant turbulent mass transfer leading to unacceptable moisture loss. Preferably, the Reynolds No. is from about 1150 to 2300. For baked products about 10 cm across (i.e., 4 inches), the preferred air velocity in the enclosure is about 0.1 m/s to 1 m/s to facilitate convection heating while controlling drying. In a more preferred embodiment, the air velocity in the enclosure is about 0.2 m/s to 0.5 m/s (about 40 fpm to 100 fpm). Thus, if heat convection does not generate such air velocity, one or more fans, pumps, or other well known devices can be included in the device to ensure suitable air velocity. Regardless of the type of heat source, it is preferable to exclude a temperature dial or controllable temperature setting on the merchandiser. The heat temperature settings are preferably factory-set so that clerks or other retail personnel will be unable to turn the heat too high, which would dry out the baked products too rapidly.

One of the support surfaces contacts at least a portion of each previously baked product to shield those portions from direct contact with the heated air, such that the drying of moisture in the baked products is controlled to maintain the organoleptic properties of the products at essentially the same level as those of freshly baked products for a period of at least about 2 hours. In one preferred embodiment, the properties are maintained for at least about 4 hours, and in another preferred embodiment, the properties are at least substantially maintained for at least about 6 hours. The support surface preferably covers at least about 34 percent of the underside of each baked product. In one preferred embodiment, the surface covers at least about 50 percent, more preferably at least about 75 percent of the underside of each baked product, and in another preferred embodiment, the surface covers at least about 95 percent of the underside of each baked product. In the most preferred embodiment, the entire bottom surface of each baked product is contacted by a support surface to minimize moisture migration from the central zone of the baked product to be warmed. For example, it has been found that holes or gaps of less than about 3 mm in diameter (less than about 7 $mm^2$) in the support surface are sufficiently small to avoid significantly contributing to the over drying of cookies that have a diameter of 10 cm.

The merchandiser typically controls the drying of the baked product so as to retain a sufficient moisture profile that is desirable to consumers. For certain products, an outer portion of the product has a lower moisture content while a central or inner portion has a higher moisture content. Generally, the inner portion would represent the innermost 33 to 66% of the area or volume of the product, and preferably the innermost 40 to 50%. The outer portion represents the outermost 17 to 33% of the area or volume of the product, and preferably the outermost 20 to 25%. In a preferred embodiment, for a round-type baked product having an overall diameter of about 5 to 12.5 cm (2 to 5 inches), the central zone of the baked product can be understood to have a width of about 2 to 3 cm (about ¾ to 1¼ inch) while the outer zone can be understood to have a diameter of about 0.6 to 1.6 cm (¼ to ⅝ inch) measured from the perimeter of the round cookie.

For a baked cookie of this type, a desired moisture profile over time can refer to a moisture loss of about 15 percent to 70 percent, preferably about 30 percent to 60 percent, of the moisture from the outer zone of the baked product over at least about 6 hours. For the central zone of this embodiment, the moisture loss is less than about 20 percent, preferably less than about 15 percent, and more preferably less than about 10 percent, over at least about 6 hours. This controlled drying provides an outer zone of a baked product that becomes somewhat drier and crispier, while retaining a relatively moister, chewier central zone that provides desired organoleptic and/or texture characteristics to the consumer.

In a preferred embodiment when the baked product includes chocolate or peanut butter chips or similar inclusions, such as in cookies or brownies, the baked product retains sufficient "chocolate pull" to provide a desired appearance and texture to the consumer. Chocolate pull is well understood by those of ordinary skill in the art to refer to the capacity of certain types of chocolate to be sufficiently viscous to create a bridge of chocolate when a baked product is pulled apart at the point where a chocolate chip is located but not so viscous as to resist pulling. Chips that are too heated become molten and chips not heated enough are too solid to pull apart. Those chips that exhibit chocolate pull are being maintained at essentially the correct temperature.

Another manner of measuring the desired moisture profile is with respect to the firmness of the baked product as time progresses. The crisp/soft boundary when warming a rounded, previously baked product moves inward over time at a controlled rate as moisture migrates out of the baked product in an apparatus of the invention. On the contrary, the crisp/soft boundary is typically at the edge of the rounded product when the product is merely placed under ambient conditions, since the moisture equilibrates over the entire baked product. Conventional warming devices will move the crisp/soft boundary far too quickly to the central portion of the baked product, resulting in an undesirable product. The firmness of baked products, which helps determine the crisp/soft boundary, can be measured using texture analyzer model TA-XT2 commercially available from Stable Micro Systems of Godalming, Surrey, England. The device typically can be used with four to six prongs to determine firmness, or stress, in a baked product warmed in an apparatus of the invention. The stress on previously baked cookies warmed in an apparatus of the invention can be as follows: for the outer zone, the stress is typically at least about 50 $g/mm^2$ after one hour of warming and at least about 150 $g/mm^2$, preferably at least about 200 $g/mm^2$ after 6 hours of warming; the central zone has a stress of less than about 25 $g/mm^2$ after one hour and less than about 45 $g/mm^2$ after 6 hours of warming. Preferably, the stress is about 3 to 5 times greater at the outer zone compared to the center zone after one hour of warming and about 5 to 7 times greater after six hours of warming.

In one embodiment, the merchandiser can be used to warm different types of baked products, such as cookies and at least one of brownies, muffins, croissants, danish, and the like. It is typically desired for the cookies to have a different moisture profile than the other types of baked goods. Thus, cookies or other products in which a dual texture is desired can be placed on one support surface, i.e., a first shelf, and the other product(s) can be placed on a second support surface, i.e., a second shelf. When a more uniform moisture profile instead of one with a sharper gradient is desired, such as for the brownies, a cover can be placed over the baked products to avoid contact with the heated air flowing throughout the chamber (either from a fan or as a result of convection currents that will naturally arise due to heating). The cover is preferably one that has a low profile so as to minimize the effect on the convective currents within the merchandiser. Thus, the cover should just clear the top of the single-texture products being warmed, e.g., for brownies a cover of about 1 inch in height should be suitable. The cover acts to trap moisture within the cover and to inhibit or avoid the drying that would otherwise occur at the edges of the brownies or other baked products. The cover can be porous, i.e., have one or more holes or apertures therein, if some moisture loss is desired or can be entirely sealed if minimizing the moisture loss is desired.

When it is desired to provide controlled drying in a previously baked dough product, the product should be kept chilled, or preferably frozen, until shortly prior to being placed in the merchandiser of the invention. "Shortly prior" means less than 2 hours, preferably no more than about 1 hour, and more preferably the baked dough product is pulled from the freezer and promptly placed in the merchandiser, optionally just after being thawed and warmed in an oven, e.g., for up to 10 minutes. Preferably, the baked dough products in which a dual texture and controlled drying are desired should not be thawed until they become too soft, particularly under ambient conditions, as the moisture would tend to equilibrate, and consequently, the fresh baked moisture profile would not be provided during warming in the merchandiser.

In one embodiment, the apparatus can be constructed with the following dimensions. The size can be from about 12 to 24 inches wide, about 12 to 24 inches deep, and about 20 to 30 inches in height (not including the optional housing over the walls). Although other amounts are possible, it is desired to place anywhere from 12 to 48 2-oz. baked products in the apparatus. The heat source is designed to heat the enclosure to a temperature from about 95° F. to 150° F., preferably from about 110° F. to 130° F. In varying embodiments, the equipment is designed to achieve a desired enclosure temperature of about 110° F. to 115° F., about 115° F. to 120° F., about 120° F. to 125° F., and about 125° F. to 130° F.

The temperature in the enclosure is preferably controlled to remain substantially constant or entirely constant. Preferably, the temperature remains at least substantially constant at every point throughout the entire enclosure, which is a result of the optional, but preferred, air circulation and the size and shape of the enclosure. To control the temperature to be substantially constant over time, any suitable device to control the temperature can be employed, such as a conventional bimetallic spring loaded thermostat coupled with an operator controlled temperature gauge (controller). This system typically provides a temperature that remains within about 10° F. of the desired fixed temperature. Some conventional systems are only able to achieve a temperature within 15° F. of the desired temperature. Preferably, however, the temperature is more constant than this variation. Particularly preferred temperature controlling devices include the "electronic controller" types, which include those commercially available from Oven Industries and from Churchill Engineering, each of which will more precisely control the heat to within 4° F., preferably even within 2° F., of the desired temperature. Proportional controllers regulate the electric power based on a signal that is proportional to the differential of sensor temperature from the set point and they are typically integrated with the solid state rectifier to provide more constant temperatures when substantially constant temperature is important. In one preferred embodiment, the thermometer used in conjunction with the rectifier and either type of controller is disposed adjacent to a wall having no aperture therein. The thermometer is also preferably disposed sufficiently far from the heat source and the one or more apertures to avoid having the readings inaccurately altered, i.e., the thermometer is preferably not next to a heating coil or light bulb.

Figure 3:
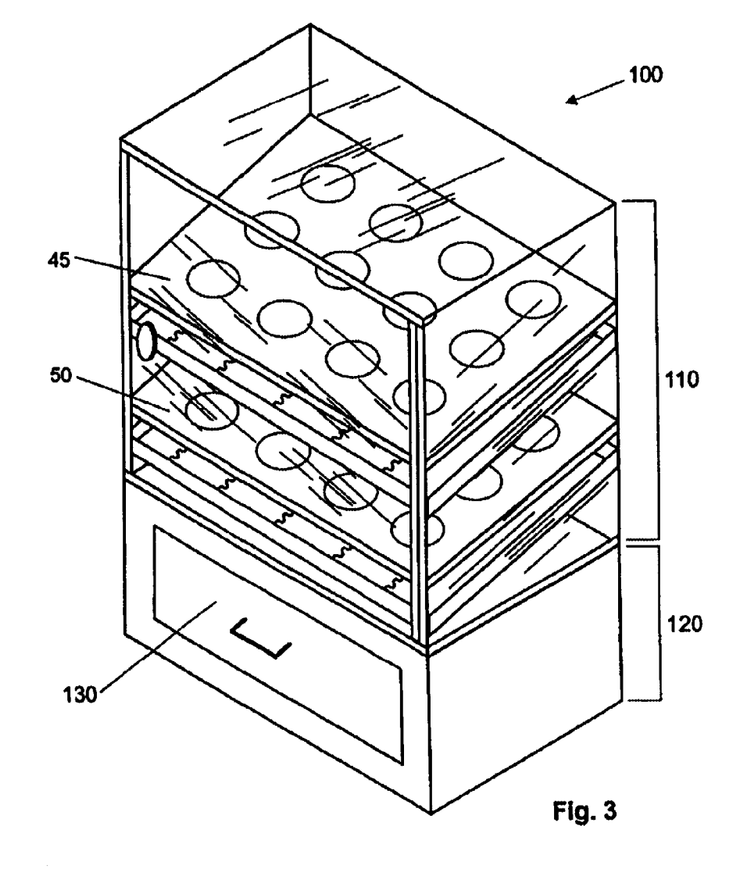
FIG. 3 illustrates a modular merchandiser system having a merchandiser and a warming compartment according to the invention.

The invention also includes a merchandizing system 100 depicted in FIG. 3 that includes a modular device 100 wherein the merchandiser 110 described above is packaged with a warming compartment 120 with a higher temperature than the merchandiser 110. It should be understood that the merchandiser 110 warms frozen baked products over about 30 to 60 minutes before they have both a suitable dual texture and are suitable for consumption. In this modular system, frozen cookies previously baked can be thawed and rapidly warmed in the warming compartment 120 in less than about 10 minutes, preferably less than about 5 minutes, and more preferably in about 1 to 3 minutes to permit more rapid sales of baked products. The warming compartment 120 is preferably sized and configured to receive the same size support surface 45, 50 used in the merchandiser 110 as described herein. For example, the warming compartment 120 can be one or more slots or drawers 130 into which the trays or sheets 45, 50 can be inserted for rapid thawing.

The baked products can be disposed on a support surface that is easily placed in the warming compartment for sufficient time to begin the warming but insufficient for the desired moisture gradient in the baked products to be destroyed. Once sufficient warming has occurred, the support surface can be removed from the warming compartment and placed in the merchandiser to be slowly warmed for display, sale, and consumption. Preferably, the merchandising system is arranged so that the merchandiser is disposed over the warming compartment to keep the merchandiser readily accessible to consumers. This embodiment conveniently avoids the need for a separate oven to rapidly warm frozen baked products such as cookies in case there is huge demand, avoids the need to transport the baked products from another area in the kitchen where an oven might be located, avoids the need to tie up oven space or time or to alter the oven settings from other typical uses, can be used in a retail or convenience store where an oven is not feasible from an economic, electricity, space, or other standpoint.

The warming compartment is typically operated at a temperature of about 275° F. to 500° F., preferably from about 300° F. to 475° F., and in one embodiment this is accomplished by convection heating. In a preferred embodiment, the warming compartment can operate from about 350° F. to 425° F. The warming compartment can include a controller for automatic cycling so that the compartment will automatically open and eject the support surface of thawed, baked goods when the heating cycle is complete. This avoids overdrying, as well as aids the clerk operating the equipment. Alternatively, an alarm can be set to automatically ring or buzz when the heating cycle is over. Another benefit of the merchandising system is that heat from the warming compartment will rise and assist in maintaining the temperature of the merchandising compartment above, which further reduces energy costs of running the system.

Placing frozen baked products in the merchandiser typically requires a short wait, e.g., 15 minutes, 30 minutes, 60 minutes, or the like, before the baked products are sufficiently thawed and have their fresh-baked characteristics to be ready for consumption. When products are first rapidly thawed in the warming compartment, they can be moved into the merchandiser for display and sale. If warmed properly, the warming compartment can speed the baked products' preparation so they are ready for consumption with a proper fresh-baked moisture profile after a much shorter time in the merchandiser.

For convenience, both the merchandiser and the warming compartment are configured to receive the same size trays. These trays can be used to initially support the frozen products before warming and then can support the baked products in the merchandiser. Thus, the products can be placed on the trays, warmed in the warming compartment and the trays can then simply be relocated to the merchandiser.

EXAMPLES

The invention is further illustrated, but not limited, in the following working examples, where all percentages and parts are by weight.

Example 1

A Prior Art Thaw and Serve Cookie

Cookies having a 4 inch diameter were previously baked and frozen. These cookies were thawed under ambient conditions and the moisture content measured over time at the outer zone, central zone, and an intermediate zone therebetween.

| Moisture Content (%) | Edge Zone | Intermediate Zone | Central Zone |
| --- | --- | --- | --- |
| After 1 hour | 5.8% | 6.9% | 8.5% |
| After 3 hours | 5.8% | 8.1% | 8.4% |
| After 6 hours | 5.4% | 7% | 8.1% |

As demonstrated, the cookies according to the prior art has an insufficient drying, or moisture loss, from the outer zone. Thus, cookies merely thawed and served after having equilibrated with ambient conditions do not have the most desired moisture profile.

Example 2

A Prior Art Apparatus Using a Wire Rack

Cookies having a 4 inch diameter were previously baked and frozen. These cookies were placed on an open wire rack in a conventional apparatus used to warm and display cookies. The wire rack had approximately a 78% open area between wires. The moisture content of the cookies was measured over time at the outer zone, central zone, and an intermediate zone therebetween, using the same definitions of these zones as for Example 1.

| Moisture Content (%) | Edge Zone | Intermediate Zone | Central Zone |
| --- | --- | --- | --- |
| After 1 hour | 4.2% | 6.7% | 8.6% |
| After 3 hours | 4.2% | 5.7% | 7.6% |
| After 6 hours | 2% | 4.5% | 7% |

As demonstrated, frozen cookies warmed by a prior art apparatus have too much drying, or moisture loss, from the central zone. The outer zone has lost a significant, but acceptable, amount of moisture over 6 hours. Thus, cookies warmed in a device that does not sufficiently contact and protect the previously baked products being warmed did not have a desired moisture profile.

Example 3

A Cookie Prepared According to a First Embodiment of the Invention

Cookies having a 4 inch diameter were previously baked and frozen. These cookies were placed on a solid tray in an apparatus according to the invention used to warm and display the cookies. The solid tray had 0% open area and the apparatus employed a resistance heating element (e.g., Calrod) for heating with no direct line of sight to the cookies. Thus, the apparatus employed a fan to provide indirect heating by blowing the air warmed by the lamps over and about the cookies. The moisture content of the cookies was measured over time at the outer zone, central zone, and an intermediate zone therebetween, using the same definitions of these zones as for Example 1.

| Moisture Content (%) | Edge Zone | Intermediate Zone | Central Zone |
| --- | --- | --- | --- |
| After 1 hour | 5% | 6.8% | 8.5% |
| After 3 hours | 3.5% | 6% | 8.5% |
| After 6 hours | 2.6% | 5% | 8.3% |

As demonstrated, the method using the apparatus according to the invention provided a desired moisture profile in the baked products even up to 6 hours. The outer zone lost sufficient moisture to provide a crispy, drier edge and the central zone retained sufficient moisture to provide a chewy, moist center.

Example 4

A Cookie Prepared According to a Second Embodiment of the Invention

Cookies having a 4 inch diameter were previously baked and frozen. These cookies were placed on a solid tray in another apparatus according to the invention used to warm and display the cookies. The solid tray had 0% open area and the apparatus employed convection heating below the tray to warm the cookies. A small air gap was provided between the conduction heating coils and the tray to facilitate more uniform heating of the underside of the tray on which the cookies were disposed. No fan was used. The moisture content of the cookies was measured over time at the outer zone, central zone, and an intermediate zone therebetween, using the same definitions of these zones as for Example 1.

| Moisture Content (%) | Edge Zone | Intermediate Zone | Central Zone |
| --- | --- | --- | --- |
| After 1 hour | 4.9% | 6.3% | 8.8% |
| After 3 hours | 3.5% | 5.9% | 8.9% |
| After 6 hours | 2.8% | 5.6% | 8% |

As demonstrated, this second apparatus according to the invention provided a desired moisture profile in the baked products even up to 6 hours. Again, the outer zone lost sufficient moisture to provide a crispy, drier edge and the central zone retained sufficient moisture to provide a chewy, moist center.

The term "about," as used herein, should generally be understood to refer to both numbers in a range of numerals. Moreover, all numerical ranges herein should be understood to include each whole integer within the range.

In some embodiments where the term "substantially" is used, that term is generally defined to mean at least about 90 percent of the value referred to, preferably at least about 95 percent of the value referred to, and more preferably at least about 99 percent of the value referred to. Correspondingly, the value will not be more than about 110 percent of the value, preferably less than about 115 percent of the value, and more preferably less than about 101 percent of the value. Thus, for example, if the temperature is 95° F. and is "substantially uniform" it will be not less than about 90 percent or more than about 110 percent of that temperature.

The term "baked," as used herein, refers to a dough product cooked to some degree to create a moisture gradient therein.

It is to be understood that the invention is not to be limited to the exact configuration as illustrated and described herein. For example, it should be apparent that a variety of materials would be suitable for use in the composition or method of making the invention according to the Detailed Description. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A method for displaying and warming previously baked dough products under controlled drying conditions, which comprises:

providing previously baked dough products that contain a predetermined average moisture level in an enclosed space upon a support surface such that the support surface contacts at least a portion of the baked products;

providing and circulating heated air in the enclosed space to assist in the controlled drying of all the baked products in the enclosure so that those supported portions of the baked products are shielded from direct contact with the heated air;

controlling temperature in the enclosure uniformly to within about 5° F. of a predetermined temperature to control the drying of moisture from all the baked products in the enclosure so as to maintain their organoleptic and/or texture properties at essentially the same level as those of freshly baked products, for a period of up to about 6 hours.

2. The method of claim 1 wherein the temperature in the enclosed space is maintained at a temperature of between about 95° F. to 150° F. so that the baked products retain their organoleptic properties for a period of up to about 6 hours.

3. The method of claim 1, which further comprises chilling or freezing the previously baked dough products before providing the chilled or frozen previously baked dough products into the enclosed space.

4. The method of claim 1, wherein the temperature in the enclosed space is maintained at a temperature of between about 110° F. to 130° F. so that the baked products retain their organoleptic properties for a period of up to about 6 hours.

5. A method for displaying and warming previously baked cookies under controlled drying conditions, which comprises:

providing previously baked cookies that contain a predetermined average moisture level in an enclosed space upon a support surface such that the support surface contacts at least a portion of the cookies;

providing heated air in the enclosed space so that those supported portions of the cookies are shielded from direct contact with the heated air;

controlling temperature in the enclosure uniformly to within about 5° F. of a predetermined temperature in order to control the drying of moisture from all the cookies in the enclosure and to maintain their organoleptic properties at essentially the same level as those of freshly baked cookies for a period of up to about 6 hours.

6. A method for providing a moisture gradient of a freshly baked product in a plurality of previously baked products while displaying the products which comprises:

disposing the previously baked products in an enclosure on a support member therein that contacts at least a portion of the base of each product to inhibit moisture loss from the products;

heating a gas so as to avoid direct application of radiation to all the baked products in the enclosure;

controlling temperature in the enclosure uniformly to within about 5° F. of a predetermined temperature; and circulating the heated gas within the enclosure to provide the moisture gradient of a freshly baked product in the plurality of previously baked products over a period of up to about 6 hours, wherein the moisture gradient is provided to the previously baked products by avoiding the application of radiation thereto and wherein the enclosure is constructed for displaying the baked products on the support member therein.

7. The method of claim 6, wherein the heated gas is heated air, at least about 34 percent of the base of each product contacts the support member, and the enclosure is configured and arranged to reduce the loss of moisture therefrom.

8. The method of claim 6, wherein the predetermined temperature in the enclosure is within the range of about 95 to 150° F. to warm the previously baked products and wherein at least about 50 percent of the base of each product contacts the support member, and wherein the air velocity is from about 0.1 m/s to 1 m/s to facilitate convection heating.

9. The method of claim 6, wherein each baked product has a central portion and an outer portion arranged about the central portion, and a moisture gradient that comprises at least about 8 percent water content in the central portion of the baked product and below about 7 percent water content in the outer portion of the baked product.

10. The method of claim 9, wherein the central portion represents the innermost 33 to 66% of the area or volume of the product and the outer portion represents the outermost 17 to 33% of the area or volume of the product, and wherein the moisture gradient comprises at least about 7.5 percent water content in the central portion and below about 4 percent water content in the outer portion after about 6 hours in the enclosure.

11. The method of claim 10, wherein the baked product is a substantially round cookie of about 3 to 5 inches in diameter, with the central portion having a width of about ¾ inch to 1¼ inch and the outer portion being a band having a diameter of about ¼ to ¾ inch.

12. A merchandiser for displaying and warming previously baked dough products under controlled drying conditions, which comprises:

an enclosure having one or more wall members that define an interior space, with at least a portion of one of the wall members being transparent, at least one aperture for access into the interior space, at least one support surface for supporting one or more previously baked dough products that contain a predetermined average moisture level therein and a heat source for providing heated air in the enclosure wherein the support surface contacts at least a portion of the previously baked products so that those portions are shielded from direct contact with the heated air such that the drying of moisture in the baked products is controlled to maintain the organoleptic and/or texture properties of the products at essentially the same level as those of freshly baked products for a period of at least about 2 hours, wherein the enclosure includes front and rear walls, and the heat source comprises light bulbs having a total wattage of about 75 W to 130 W that are arranged symmetrically within the enclosure, being placed at a sufficient distance from the support surface to direct light and heated air substantially uniformly toward the tray member and the baked products thereon.

13. The merchandiser of claim 12, wherein each support surface includes a tray member adapted to receive a baked product having a relatively flat base portion and a top portion, the support surface having a flat upper surface that supports and contacts the base portions of the baked products so that the base portions are shielded from heated air in the enclosure and dry at a rate that is different from that of the top portions of the baked products.

14. The merchandiser of claim 13, further comprising a mounting structure associated with the enclosure for mounting and positioning each support surface at a user accessible location and wherein the tray member includes a lip extension on at least one side thereof to assist in preventing baked products from sliding off the tray member, and the tray member is removably mounted upon the mounting structure to facilitate product placement thereon and cleaning thereof.

15. The merchandiser of claim 12, wherein the heat source comprises a heating element for heating the air in the enclosure, the heating element being located sufficiently away from the baked products and tray such that direct contact heating of the products on the tray by the element is substantially avoided.

16. The merchandiser of claim 12, wherein the heat source operates to maintain the interior space of the enclosure at a temperature of about 95° F. to about 150° F. and the baked product retains its organoleptic properties for a period of at least about 6 hours.

17. The merchandiser of claim 12, wherein the temperature is maintained at a constant to within about 5° F. of the desired temperature.

18. The merchandiser of claim 12, wherein the temperature control system comprises a proportional controller having a control circuit and sensor signal that regulates the electric power based on a signal that is proportional to the differential of sensor temperature from the set point.

19. The merchandiser of claim 12, wherein the temperature control system comprises a solid state rectifier integrated with the control circuit and sensor signal to provide the constant temperature.

20. The merchandiser of claim 12, wherein the temperature controller further comprises at least one thermometer placed sufficiently far from each aperture and each heat source to accurately monitor the temperature in the enclosure.

21. A merchandiser for displaying and warming previously baked dough products under controlled drying conditions, which comprises:

an enclosure having one or more wall members that define an interior space, with at least a portion of one of the wall members being transparent, at least one aperture for access into the interior space, at least one support surface for supporting one or more previously baked dough products that contain a predetermined average moisture level therein, wherein each support surface includes a tray member adapted to receive each baked product having a relatively flat base portion and a top portion, the support surface having a substantially planar upper surface that supports and contacts the base portions of the baked products so that the base portions are shielded from heated air in the enclosure and dry at a rate that is different from that of the top portions of the baked products;

a heat source for providing heated air in the enclosure wherein the support surface contacts at least a portion of the previously baked products;

a temperature control device operatively associated with the heat source for controlling the temperature in the enclosure uniformly to within about 5° F. of a predetermined temperature;

a mounting structure associated with the enclosure for mounting and positioning each support surface at a user accessible location and wherein the tray member is associated with the mounting structure to facilitate product placement thereon; and an air-moving device for circulating heated air in the enclosed space so that those supported portions of the baked products are shielded from direct contact with the heat source to control the drying of moisture from all the baked products in the enclosure and to maintain their organoleptic and/or texture properties at essentially the same level as those of freshly baked products for a period of up to about 6 hours.

22. The merchandiser of claim 21, wherein the heat source comprises a heating element for heating the air in the enclosure, the heating element being located sufficiently away from the baked products and tray such that direct radiative heating of the products on the tray by the element is substantially avoided, and wherein the heat source operates to maintain the interior space of the enclosure at a temperature of about 95° F. to about 150° F. so that the baked product retains its organoleptic properties for a period of at least about 6 hours.

23. The merchandiser of claim 21 wherein the temperature control device maintains the temperature to within about 2° F. of the desired temperature to control the drying of the baked dough products in the enclosure.

24. The merchandiser of claim 21, wherein the air-moving device operates to provide an air velocity of from about 0.1 m/s to 1 m/s to facilitate convection heating and so as to avoid significant turbulent mass transfer leading to unacceptable moisture loss in the baked products.

25. The merchandiser of claim 21, wherein the tray member comprises at least one tray, each of which is at least substantially planar, and wherein each tray is positioned at an angle in the enclosure to facilitate the circulating of heated air in the enclosure and to increase visibility of the previously baked products thereon.

26. The merchandiser of claim 21, wherein the temperature control device further comprises at least one thermometer placed sufficiently far from each aperture and each heat source to accurately monitor the temperature in the enclosure.

27. The merchandiser of claim 21, wherein the support surface is an unattached, removable tray, sheet, or rack that is operatively associated with the mounting structure by being disposed thereon.

28. A merchandiser for displaying and warming previously baked dough products under controlled drying conditions, which comprises:

an enclosure having one or more wall members that define an interior space, with at least a portion of one of the wall members being transparent, at least one aperture for access into the interior space, at least one support surface for supporting one or more previously baked dough products that contain a predetermined average moisture level therein, wherein each support surface includes a tray member adapted to receive a baked product having a relatively flat base portion and a top portion, the support surface having a substantially planar upper surface that supports and contacts the base portions of the baked products so that the base portions are shielded from heated air in the enclosure and dry at a rate that is different from that of the top portions of the baked products;

a heat source for providing heated air in the enclosure wherein the support surface contacts at least a portion of the previously baked products;

a mounting structure associated with the enclosure for mounting and positioning each support surface at a user accessible location and wherein the tray member is removably mounted upon the mounting structure to facilitate product placement thereon and cleaning thereof by removing the tray member from the enclosure; and an air-moving device for circulating heated air in the enclosed space so that those supported portions of the baked products are shielded from direct contact with the heat source to control the drying of moisture from all the baked products and to maintain their organoleptic and/or texture properties at essentially the same level as those of freshly baked products for a period of at least about 2 hours, wherein the enclosure includes front and rear walls, the heat source comprises electrical illumination, wherein the electrical illumination comprises a plurality of light bulbs that are arranged symmetrically within the enclosure to direct light and heated air substantially uniformly toward the tray member and the baked products thereon to heat and warm the air in the enclosure.

* * * * *